United States Patent [19]

Kaneta et al.

[11] Patent Number: 4,603,352

[45] Date of Patent: Jul. 29, 1986

[54] EXTERNAL SYNCHRONIZING METHOD AND APPARATUS FOR INFORMATION TRANSMISSION SYSTEM

[75] Inventors: Yoshio Kaneta, Machida; David Elberbaum, Tokyo, both of Japan

[73] Assignee: Elbex (Japan) Ltd., Tokyo, Japan

[21] Appl. No.: 638,505

[22] Filed: Aug. 7, 1984

[30] Foreign Application Priority Data

Aug. 12, 1983 [JP] Japan .................... 58-146737

[51] Int. Cl.[4] ............................................. H04N 5/04
[52] U.S. Cl. .................................... 358/148; 358/147; 358/149; 375/107
[58] Field of Search ............... 358/147, 148, 149; 370/100, 102, 103; 375/107, 113; 455/51

[56] References Cited

U.S. PATENT DOCUMENTS 3,816,658 6/1974 Vidovic .............................. 358/149
4,333,103 6/1982 Koiwa et al. ...................... 358/149
4,489,348 12/1984 Lepley .............................. 358/149

Primary Examiner—James J. Groody
Assistant Examiner—Michael D. Parker
Attorney, Agent, or Firm—Kane, Dalsimer, Kane, Sullivan and Kurucz

[57] ABSTRACT

In an information transmission system including transmitters, a receiver, and a transmission line for transmitting information signals from the transmitters to the receiver, the transmission line is shared by the information signals and external sync signals which are adapted to synchronize the transmitters to each other. The external sync signals have a voltage level higher than a maximum voltage level of the information signals or lower than a minimum voltage level of the same, and are transmitted to the transmitters over the transmission line by using blanking level portions of the information signals. The external sync signals are separated from the information signals based on their level difference and, then, applied to the transmitters. Amplifier circuits for blocking the propagation of signals toward the transmitters are installed in the transmission line, while bypass circuits are connected to the transmission line each in parallel to the associated amplifier circuit so as to allow only the external sync signals to be transmitted toward the transmitters based on a signal voltage level.

8 Claims, 4 Drawing Figures

EXTERNAL SYNCHRONIZING METHOD AND APPARATUS FOR INFORMATION TRANSMISSION SYSTEM

BACKGROUND OF THE INVENTION

The present invention relates to an external synchronizing method and apparatus for synchronizing a plurality of transmitters in an information transmission system to each other.

In a monitor television (TV) system which is one of information transmission systems available today, a plurality of remote TV cameras are switchably connected to at least one TV monitor by a transmission line. One is allowed to observe images picked up by any one of the TV cameras on the TV monitor by switching operations because information signals inclusive of image signal components are delivered from the respective cameras to the monitor over the transmission line. The prerequisite in this kind of information transmission system is that synchronization be set up between the cameras, or transmitters, in order to prevent the image on the monitor, or receiver, from being disturbed just after switching the cameras from one to another.

Synchronization between the transmitters is usually implemented by sync signals which are generated by an external sync signal generator. The sync signals, or external sync signals, have customarily been distributed to each transmitter over an exclusive external sync signal line which is independent of the transmission line adapted for the delivery of information signals from the transmitter to the receiver. The problem with the prior art transmission system is, therefore, that the transmission line and the external sync signal lines extending in parallel with the transmission line make the wiring of the system extremely intricate.

SUMMARY OF THE INVENTION

It is therefore an object of the present invention to provide an external synchronizing method and apparatus for an information transmission system which is capable of synchronizing a plurality of transmitters to each other without complicating the wiring and by means of a simple construction.

In one aspect of the present invention, there is provided a method of synchronizing a plurality of transmitters which are included in an information transmission system in combination with at least one receiver and a transmission line for transmitting information signals output from the respective transmitters to the receiver. A pulse signal having a voltage level higher than a maximum voltage level of the information signals or lower than a minimum voltage level of the information signals is transmitted to the respective transmitters over the transmission line as an external sync signal by using blank level portions of the information signals. The pulse signal transmitted over the transmission line is separated from the information signals on the basis of a level difference of the pulse signal from the information signals. The separated pulse signal is applied to the respective transmitters.

In another aspect of the present invention, there is provided a device for synchronizing a plurality of transmitters which are included in an information transmission system in combination with at least one receiver, a transmission line extending from the receiver and having branch lines respectively connecting to the transmitters to transmit information signals output from the transmitters to the receiver, and amplifier circuit means associated respectively with the branch lines of the transmission line for blocking propagation of signals toward the transmitters. An external sync signal generator circuit is connected to the respective branch lines of the transmission line at that side of each of the amplifier circuit associated with the branch lines which is adjacent to the receiver, for generating a pulse signal having a voltage level higher than the maximum voltage level of the information signals output from the respective transmitters or lower than the minimum voltage level of the information signals. Bypass passages are connected respectively to the branch lines in parallel to the amplifier circuits for allowing only the pulse signal to be transmitted toward the transmitters on the basis of a signal voltage level. Comparator circuits are associated respectively with the transmitters for separating the pulse signal transmitted over the branch lines from the information signals on the basis of a level difference of the pulse signal from the information signals, and applies the separated pulse signal to the transmitters associated with the comparator circuits, thereby synchronizing the transmitters to each other.

The above and other objects, features, and advantages of the present invention will become apparent from the following detailed description taken with the accompanying drawings.

DESCRIPTION OF THE PREFERRED EMBODIMENT

While the external synchronizing method and apparatus for an information transmission system of the present invention is susceptible of numerous physical embodiments, depending upon the environment and requirements of use, a substantial number of the herein shown and described embodiments have been made, tested, and used, and all have performed in an eminently satisfactory manner.

Figure 1:
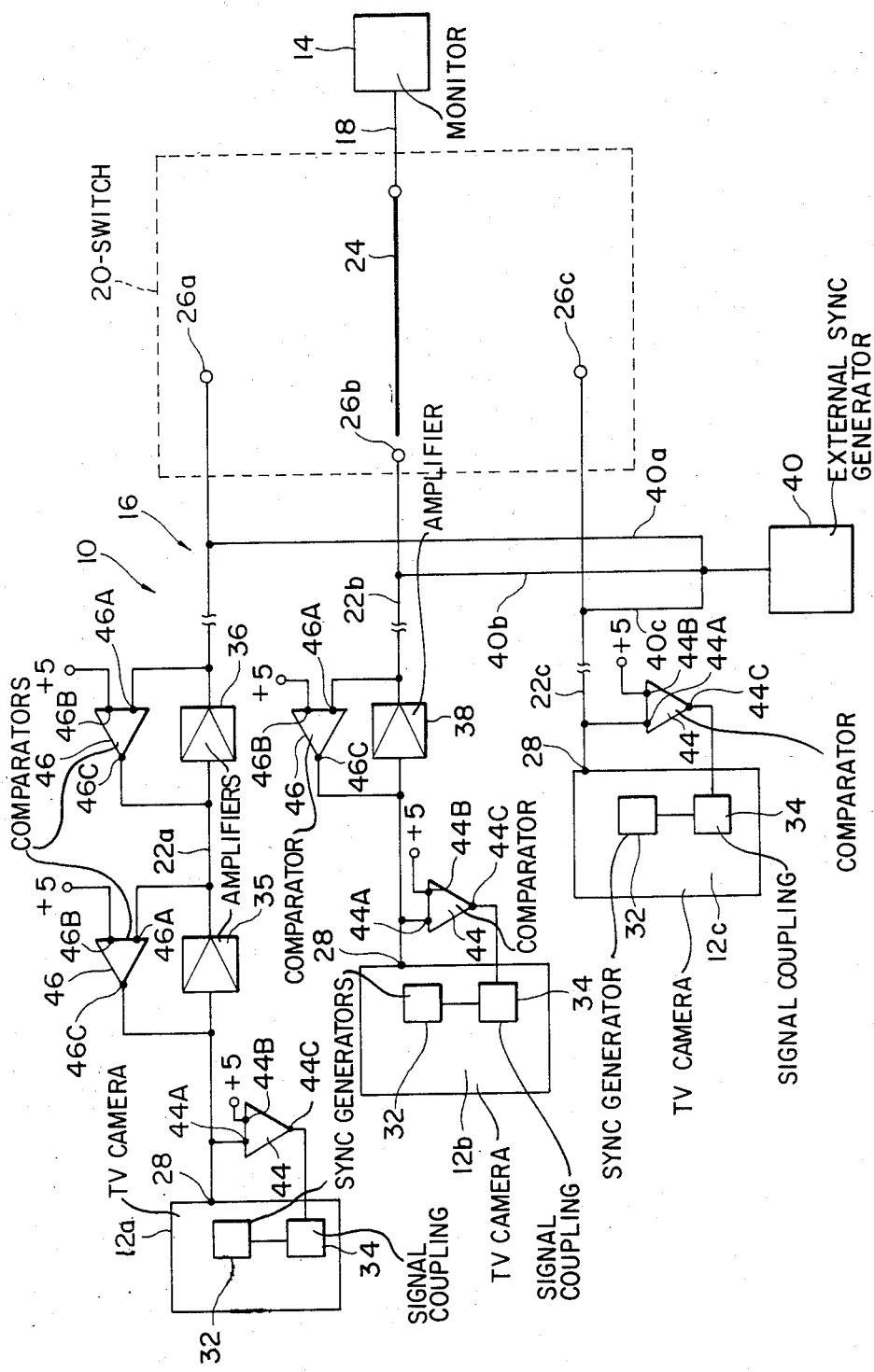
FIG. 1 is a circuit diagram representative of an information transmission system to which an apparatus for external synchronization in accordance with the present invention is applied.

Referring to FIG. 1 of the drawings, a monitor TV system to which the present invention is applied is shown and generally designated by the reference numeral 10. The system 10 comprises a plurality of TV cameras, or transmitters, 12 and at least one TV monitor, or receiver, 14. While three TV cameras 12a, 12b and 12c are used in this particular embodiment, such is only illustrative and any other desired number of transmitters may be installed in the system.

The cameras 12a, 12b and 12c are individually connected to the monitor 14 by a transmission line 16. As shown, the transmission line 16 is made up of a main trunk 18 connecting at one end to an input terminal of the monitor 14, and a plurality of branch lines 22a, 22b and 22c in the illustrative embodiment, which extend from a switch 20 to the cameras 12a, 12b and 12c, respectively. While the switch 20 is shown to comprise a mechanical switch having a movable contact 24 and a plurality of stationary contacts 26a, 26b and 26c in this particular embodiment, selectively engageable with the stationary contact 24, it will be seen that it may be replaced by an electronically operated switch. The other end of the main trunk 18 connects to the movable contact 24 of the switch 20. The branch lines 22a, 22b and 22c connect at one end to the stationary contacts 26a, 26b and 26c of the switch 20 and at the other end to information signal output terminals 28 of the cameras 12a, 12b and 12c, respectively.

Figure 2:
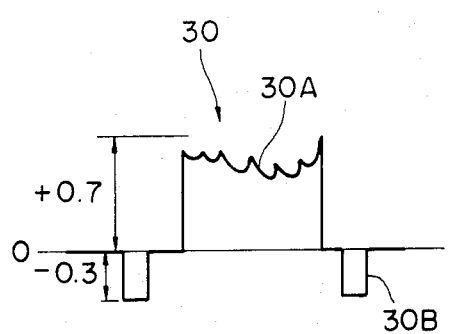
FIG. 2 shows a waveform of an information signal.

Appearing at the output terminal 28 of each camera 12 is such an information signal as one shown in FIG. 2, i.e., an information signal 30 which includes a video or information signal component 30A. In the example shown in FIG. 2, the information signal 30 includes internal sync signal components 30B which are generated by an internal sync signal generator circuit 32 associated with each camera 12. The sync signal components 30B are opposite in polarity to the information signal component 30A with respect to the blanking level of the information signal (zero volt in this example). A signal coupling circuit 34 which is well known in the art is installed in each camera 12 and connected to the internal sync signal generator 32. In response to an external sync signal which will be described, the signal coupling circuit 34 causes the previously mentioned internal sync signal into correspondence with the external sync signal.

The switch 20 is operated to selectively set up connection between one of the branch lines 22a-22c extending from the cameras 12a-12c and the main trunk 18. In this construction, the information signal ouptut from each camera 12 is selectively transmitted to the monitor 14 over the transmission line 16. The information signal entered the monitor 14 is applied to a signal separator circuit which is not shown in the drawing but well known in the art, so that the information signal component 30A is separated for the reproduction of the image on the monitor 14. The internal sync signal components 30B contained in the information signal is separated by a signal separator circuit which is also well known in the art and not shown in the drawing. The sync signal components 30B, as has been customary, is adapted to synchronize the selected camera 12 to the monitor 14.

The switch 20 is located in the vicinity of the monitor 14 in order to allow easy access thereto by the viewer. Therefore, the lengthwise dimension of the main trunk 18 is far shorter than those of the branch lines 22a-22c. The branch lines 22a-22c, on the other hand, have lengthwise dimensions which are commensurate with their locations; in the illustrative embodiment, the length sequentially decreases in the order of the branch lines 22a, 22b and 22c. The branch lines except for the short one are furnished with means for eliminating attenuation of the information signal 30, that is, the branch line 22a includes a signal amplifier circuits 35 and 36 and the branch line 22b, a signal amplifier circuit 38.

In detail, the branch line 22a having the largest length is provided with a series connection of two signal amplifier circuits 35 and 36. One 35 of the two signal amplifier circuits may comprise a buffer amplifier well known in the art, while the other 36 may comprise a line compensating amplifier also well known in the art. The signal amplifier circuit 38 associated with the branch line 22b having a medium length comprises a booster amplifier well known in the art. As usual, the signal amplifier circuits 35, 36 and 38 serve to amplify and allow the passage of the signals, which are routed toward the monitor 14 over the associated branch lines 22a and 22b, while preventing signals from being routed in the opposite direction. If desired, use may be made of distribution amplifiers as the signal amplifier circuits.

Should the remote transmitters, i.e., TV cameras, be out of synchronization, the image on the monitor 14 would be disturbed just after the manipulation of the switch 20. In accordance with the present invention, such an occurrence is precluded by use of an arrangement wherein external sync signals output from an external sync signal generator 40 are applied to the respective cameras 12a-12c over their associated branch lines 22a-22c of the transmission line.

Comprised of a pulse signal generator well known in the art, the external sync signal generator 40 has an output terminal connecting to the branch lines 22a-22c via branch output lines 40a, 40b and 40c, respectively. Concerning the branch lines 22a and 22b with the amplifier circuits, the branch output lines 40a and 40b connect to them each in a position closer to the monitor 14 than to the associated camera 12 with respect to the amplifier circuit. Therefore, the branch line 22a furnished with the two signal amplifier circuits 35 and 36 is connected to the branch output line 40a at the output side of the amplifier circuit 36 which is closer to the monitor 14 than the amplifier circuit 35. Preferably, the branch output lines 40a-40c are connected respectively to the branch lines 22a-22c each at a position of the latter which is as close to the switch 20 as possible.

Figure 3:
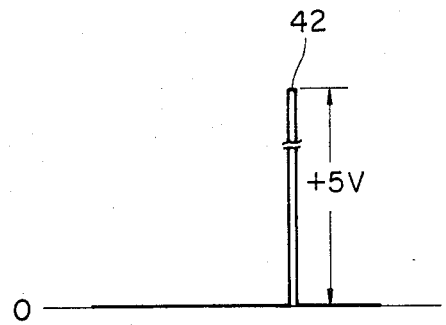
FIG. 3 shows a waveform of an external sync signal.

The pulse signal generator 40 functions to generate pulse signals whose voltage level is higher than the maximum voltage level of the information signals or lower than the minimum voltage level of the same. Such pulse signals are sent out to the branch lines 22a-22c via the branch output lines 40a-40c, respectively. Assume, for example, that the blanking level of the information signal 30 is zero volt, that the maximum voltage level of the information signal components 30A of the information signal is +0.7 volt, and that the level of the internal sync signal components 30B in the information signal is −0.3 volt. Then, the maximum and minimum voltage levels of the information signal are 0.7 volt and −0.3 volt, respectively. In this case, the pulse signal generator 40 is comprised of a pulse generator which generates a positive pulse signal 42 sufficiently higher than the maximum voltage level of the information signal as shown in FIG. 3, and having a predetermined repetition period.

Meanwhile, where the internal sync signal 30B opposite in polarity to the sync signal components 30A is absent in the information signal 30, the minimum voltage level of the information signal is zero volt and, therefore, the pulse signal generator 40 may be of the kind which generates a negative pulse signal. Further, where the information signal 30 includes the previously mentioned internal sync signal components 30B opposite in polarity to the information signal components 30A, it is also possible to use a pulse signal generator which generates a pulse signal lower than −0.3 volt, i.e., a negative pulse signal whose absolute value is larger than 0.3. Nevertheless, the pulse signal common in polarity to the internal sync signal components 30B effects the internal sync signal when used as the external sync signal and, therefore, it is desirable that the external sync signal be comprised of a pulse signal opposite in polarity to the internal sync signal.

Figure 4:
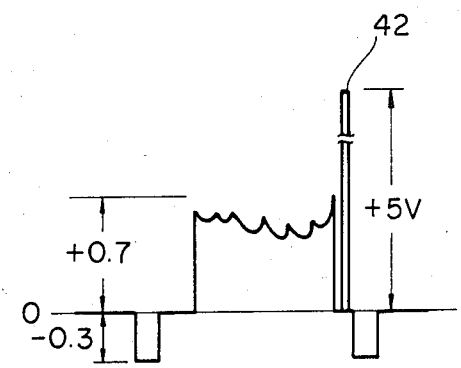
FIG. 4 shows a waveform representative of combined information signal and external sync signal.

The pulse signal output from the pulse signal generator 40, designated by the reference numeral 42, is routed to the branch lines 22a–22c of the transmission line via the branch output lines 40a–40c associated with the branch lines. In the branch line 22c which lacks the amplifier circuit, propagation of the pulse signal 42 therethrough toward the camera 12c is not obstructed; as shown in FIG. 4, the pulse signal 42 is combined with the information signal 30 at a blanking level portion of the latter and, then, transmitted to the camera 12c over the branch line 22c. A comparator circuit 44 is connected to the branch line 22c adjacent to the camera 12c in order to separate the pulse signal components 42 from the information signal 30, the separated pulses 42 being applied to the coupling circuit 34. Since the pulses 42 applied to the coupling circuit 34 function as reset pulses for the internal sync signal generator 32 as well known in the art, they can be combined with the information signal 30 at blanking level portions of the latter as shown in FIG. 4. It will be noted that in the case where the blanking level of the information signal 30 is biased to a certain value, the level of the whole composite signal of the information signal 30 and the pulse signal 42 will be increased or decreased commensurate with the bias level.

The comparator circuit 44, as usual, comprises two inputs 44A and 44B and one output 44C. One 44A of the inputs of the comparator 44 is connected to the branch line 22c. The other input 44B is applied with a reference voltage which is a +5 volts dc voltage equal to the voltage level of the pulse signal 42. In this construction, the comparator 44 develops at its output 44C a pulse signal corresponding to those portions of the composite signal propagating through the branch line 22c which are higher than +5 volts. This allows the pulses 42 of the composite signal to be substantially separated from the information signal 30 and, then, be applied to the coupling circuit 34 as previously described. The reference voltage may have any desired value so long as it lies in a range wherein the pulses 42 can be separated from the information signal 30, i.e., between the maximum voltage level of the information signal 30 and the voltage level of the pulse signal 42 or between the minimum level of the information signal 30 and the voltage level of the pulse signal 42. If desired, instead of equalizing the voltage level of output pulses of the comparator 44 to the previously mentioned reference voltage, it may be increased or decreased beyond the level of the reference voltage.

Where a pulse signal the voltage level of which is lower than the minimum voltage level of the information signal is used as the external sync signal, a negative reference voltage will be applied to the input 44A of the comparator 44 in order to separate the pulse signal components.

As described above, concerning the branch path without the amplifier circuit, it is possible to transmit the pulse signal 42 from the pulse signal generator 40 to the camera, or transmitter, 12c over the branch line 22c by combining it with the information signal 30 which is propagating through the branch line 22c. The comparator 44 associated with the branch line 22c separates the pulse signal 42 and supplies it to the coupling circuit 34 of the camera 12c.

Meanwhile, in the branch lines 22a or 22b, the amplifier circuits 35 and 36 or the amplifier circuit 38 associated therewith obstructs the passage of the composite signal toward the associated camera, or transmitter, 12a or 12b through the branch line 22a or 22b. In accordance with the present invention, a bypass circuit, or passage, 46 is connected in parallel with each of the amplifier circuits 35, 36 and 38 in order to enable the pulses 42 to be fed to the transmitter 12a or 12b over the associated branch line 22a or 22b.

Constructed in the same manner as the comparators 44, each of the bypass circuits 46 has one input 46A connecting to the branch line 22a or 22b at the output side of the associated amplifier circuit 35, 36 or 38, and the other input terminal 46B receiving a reference voltage as in the comparator circuit 44. An input of each comparator 46 connects to the branch line 22a or 22b at the input side of the associated amplifier 35, 36 or 38. The comparator 46, like the comparator 44, develops at its output terminal 46C a pulse signal which corresponds to the pulse signal 42 of the composite signal shown in FIG. 4. With this arrangement, the bypass circuit 46, or comparator, substantially allows the propagation of the pulse signal 42 in the opposite direction, i.e., toward the associated transmitter 12a or 12b.

As a result, the pulse signal 42 is successfully transmitted to the transmitters 12a and 12b via the associated branch lines 22a and 22b, combined with the information signals at the blanking level of the latter as shown in FIG. 4. Comparator circuits 44 similar to the comparator circuit 44 associated with the transmitter 12c are connected respectively to the branch lines 22a and 22b adjacent to the associated transmitters 12a and 12b. Each of these comparator circuits 44 is adapted to separate the pulse signal component 42 from the information signal and feed it to the signal coupling circuit 34 installed in the associated transmitter 12a or 12b.

In the above-described construction, the transmitters 12a–12c are individually supplied with an external sync signal which is the pulse signal transmitted over the branch lines, regardless of the operation of the switch 20. Hence, all of them are held in a mutually synchronized state so that disturbance to the image appearing on the monitor 14 is eliminated even just after the manipulation of the switch 20.

The system utilizes the transmission line for the transmission of the external sync signal to the respective transmitters. This eliminates the need for exclusive lines for the external sync signal which are independent of the transmission line, thereby simplifying electrical wiring of the system.

In addition, since the external sync signal in accordance with the present invention is a pulse signal which is different in voltage level from information signals, it can be separated on the basis of the difference in signal voltage level. Such promotes the use of simple comparator circuits as separator means and, thereby, realizes synchronization between the remote transmitters in the system with an economical and simple construction.

The present invention has been shown and described in relation with a monitor TV system, a typical example of information transmission systems. It should be noted, however, that the present invention is similarly applicable to other various kinds of information transmission systems which need externally derived synchronization between a plurality of transmitters, e.g., a computer system wherein computers containing various kinds of information are the transmitters and a terminal is the receiver, and a measurement system wherein various measuring devices are the transmitters and a data processor is the receiver.

Various modification will become possible for those skilled in the art after receiving the teachings of the present disclosure without departing from the scope thereof.

What is claimed is:

1. A method of synchronizing a plurality of transmitters which are included in an information transmission system in combination with at least one receiver and a transmission line for transmitting information signals output from respective transmitters to the receiver, said method comprising the steps of:

transmitting a pulse signal having a voltage level higher than a maximum voltage level of said information signals or lower than a minimum voltage level of said information signals to respective transmitters over the transmission line as an external sync signal by using blanking level portions of the information signals;

separating said pulse signal transmitted over the transmission line from said information signals by comparing said transmitted signals to a reference signal having a voltage level approximately equal to the voltage level of the pulse signal; and applying said separated pulse signal to respective transmitters.

2. A method as set forth in claim 1, wherein said pulse signal is opposite in polarity to an internal sync signal which is contained in each of said information signals.

3. A device for synchronizing a plurality of transmitters which are included in an information transmission system in combination with at least one receiver, a transmission line extending from the receiver and having branch lines connected respectively to the transmitters for transmitting information signals output from the transmitters to the reciever, and amplifier circuit means associated respectively with the branch lines of the transmission line for blocking propagation of signals toward the transmitters, said device comprising:

external sync signal generator circuit means connected to respective branch lines of the transmission line adjacent to the receiver, for generating a pulse signal having a voltage level higher than a maximum voltage level of said information signals output from the respective transmitters or lower than a minimum voltage level of said information signals;

bypass passages consisting of a first comparator circuit means connected respectively to the branch lines in parallel to the amplifier circuit means for allowing only said pulse signal to be transmitted toward the transmitters on the basis of a signal voltage level; and second comparator circuit means associated respectively with the transmitters for separating said pulse signal transmitted over the branch lines from said information signals by comparing said transmitted signals to a reference signal having a voltage level approximately equal to the voltage level of the pulse signal, and applying said separated pulse signal to the transmitters associated with said second comparator circuit means, thereby synchronizing the transmitters to each other.

4. A device as set forth in claim 3, wherein a switch for selectively connecting the branch lines to the receiver is provided on the transmission line, the external sync signal generator means being connected to the respective branch lines in the vicinity of said switch.

5. A device as set forth in claim 3, wherein the amplifier circuit means comprises a buffer amplifier.

6. A device as set forth in claim 3, wherein the amplifier circuit means comprises a booster amplifier.

7. A device as set forth in claim 3, wherein the amplifier circuit means comprises a line compensating amplifier.

8. A device as set forth in claim 3, wherein the amplifier circuit means comprises a distribution amplifier.

* * * * *